(12) United States Patent
Rustad et al.

(10) Patent No.: US 10,047,303 B2
(45) Date of Patent: Aug. 14, 2018

(54) ADDITIVE MANAGEMENT SYSTEM

(71) Applicant: OneSubsea IP UK Limited, London (GB)

(72) Inventors: Rolf Rustad, Radal (NO); Harald Solheim, Radal (NO); Gro Merete Alendal, Bergen (NO)

(73) Assignee: ONESUBSEA IP UK LIMITED, London, England (GB)

( * ) Notice: Subject to any disclaimer, the term of this patent is extended or adjusted under 35 U.S.C. 154(b) by 243 days.

(21) Appl. No.: 14/925,696

(22) Filed: Oct. 28, 2015

(65) Prior Publication Data

US 2016/0115395 A1 Apr. 28, 2016

Related U.S. Application Data

(60) Provisional application No. 62/069,729, filed on Oct. 28, 2014, provisional application No. 62/144,178, filed on Apr. 7, 2015, provisional application No. 62/186,050, filed on Jun. 29, 2015, provisional application No. 62/173,750, filed on Jun. 10, 2015.

(51) Int. Cl.
| | | |
|---|---|---|
| G05D 7/00 | (2006.01) |
| C10G 33/08 | (2006.01) |
| G05B 15/02 | (2006.01) |
| G05D 7/06 | (2006.01) |
| E21B 37/06 | (2006.01) |
| G01F 1/00 | (2006.01) |

(52) U.S. Cl.
CPC .............. *C10G 33/08* (2013.01); *E21B 37/06* (2013.01); *G05B 15/02* (2013.01); *G05D 7/0617* (2013.01); *G01F 1/00* (2013.01)

(58) Field of Classification Search
CPC ......... C10G 33/08; E21B 37/06; G05B 15/02; G05D 7/0617; G01F 1/00
USPC ........................................................ 700/282
See application file for complete search history.

(56) References Cited

U.S. PATENT DOCUMENTS

| | | |
|---|---|---|
| 6,831,470 B2 | 12/2004 | Xie et al. |
| 9,002,650 B2 | 4/2015 | Lievois et al. |
| 2003/0011386 A1 | 1/2003 | Xie et al. |
| 2009/0294123 A1 | 12/2009 | Mescall et al. |
| 2012/0318502 A1* | 12/2012 | Lievois ..................... G01F 1/74 166/250.15 |

FOREIGN PATENT DOCUMENTS

| | | |
|---|---|---|
| EP | 2671623 A1 | 12/2013 |
| GB | 2482984 A | 2/2012 |
| WO | 98/50680 A2 | 11/1998 |
| WO | WO 98/50680 * | 11/1998 |
| WO | 00/37770 A1 | 6/2000 |

(Continued)

OTHER PUBLICATIONS

PCT International Search Report and Written Opinion; Application No. PCT/IB2015/058322; dated Feb. 8, 2016; 12 pages.

*Primary Examiner* — Fernando Hidalgo
(74) *Attorney, Agent, or Firm* — Fletcher Yoder, P.C.

(57) ABSTRACT

A system including a controller configured to receive feedback from at least one sensor configured to monitor a fluid flow of a hydrocarbon extraction system. The fluid flow includes water and an injected chemical. Additionally, the controller is configured to determine a ratio of the injected chemical to water in the fluid flow.

24 Claims, 7 Drawing Sheets

(56) References Cited

FOREIGN PATENT DOCUMENTS

| | | |
|---|---|---|
| WO | 2004/016904 A1 | 2/2004 |
| WO | 2008/131218 A2 | 10/2008 |
| WO | 2011/073790 A2 | 6/2011 |
| WO | 2013/062473 A1 | 5/2013 |
| WO | 2013/190093 A2 | 12/2013 |

* cited by examiner

ADDITIVE MANAGEMENT SYSTEM

CROSS REFERENCE TO RELATED APPLICATION

This application claims priority to and benefit of U.S. Provisional Application No. 62/069,729, entitled "Monoethylene Glycol Injection Control System", filed Oct. 28, 2014, U.S. Provisional Application No. 62/144,178, entitled "Additive Management System," filed Apr. 7, 2015, U.S. Provisional Application No. 62/186,050, entitled "Additive Management System," filed Jun. 29, 2015, and U.S. Provisional Application No. 62/173,750, entitled "Method and System for Measuring the Injection Rate of a Chemical in a Fluid Flow Stream," filed Jun. 10, 2015, the disclosures of which are herein incorporated by reference in their entireties for all purposes.

BACKGROUND

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

Hydrate formation in hydrocarbon extraction operations is an industry wide concern. Hydrates are formations of ice and gas that may form due to high pressures and low temperatures in hydrocarbon extraction environments. In order to block hydrate formation, a variety of hydrate inhibitors are used, such as mono-ethylene glycol. These hydrate inhibitors may block hydrate formation by lowering the freezing point of water. Unfortunately, hydrate inhibitors may be used excessively to prevent hydrate formation, which unnecessarily increases the cost of hydrocarbon extraction operations.

BRIEF DESCRIPTION OF THE DRAWINGS

Various features, aspects, and advantages of the present invention will become better understood when the following detailed description is read with reference to the accompanying figures in which like characters represent like parts throughout the figures, wherein.

DETAILED DESCRIPTION OF SPECIFIC EMBODIMENTS

Figure 1:
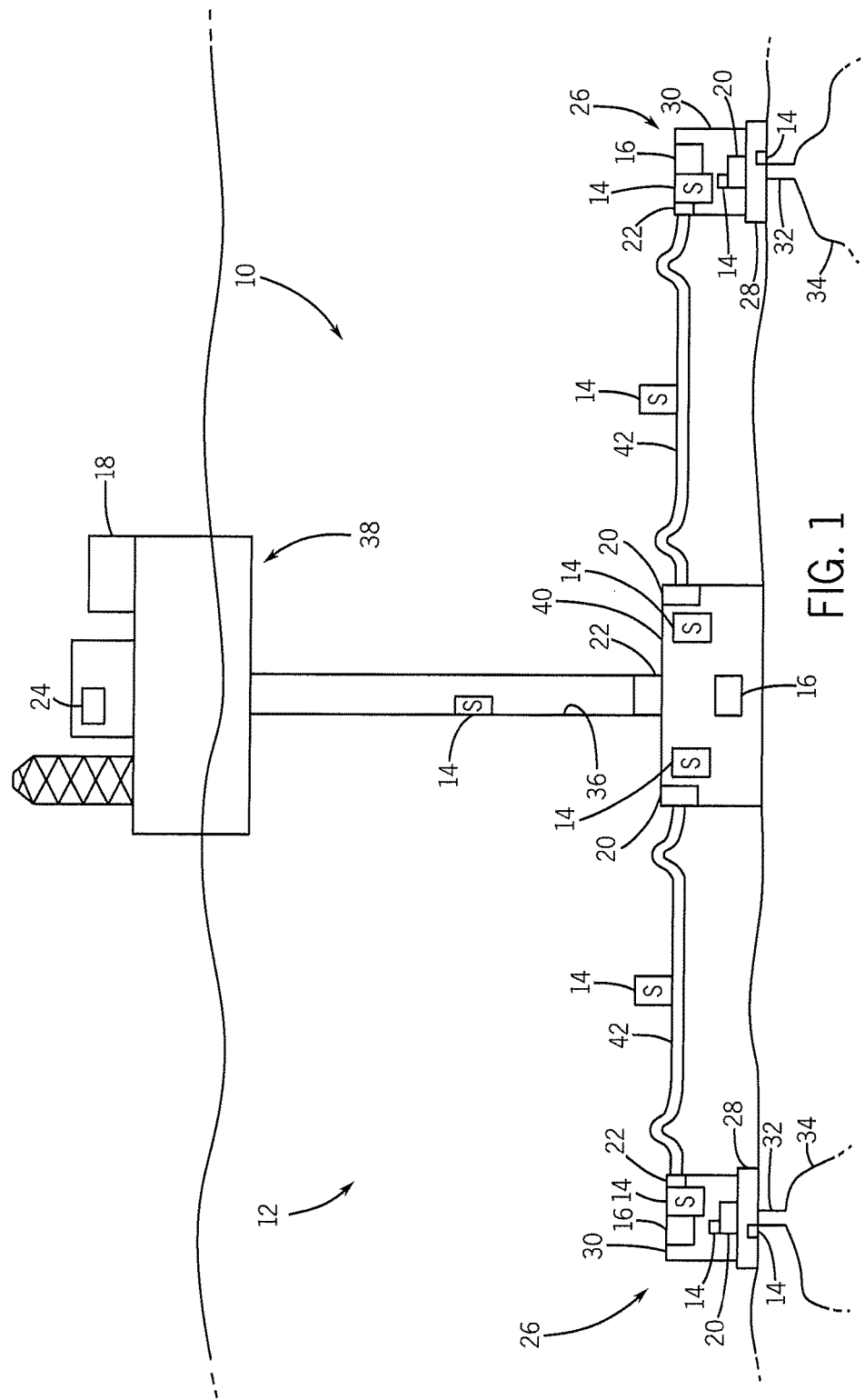
FIG. 1 is a schematic view of an embodiment of a hydrocarbon extraction system with an additive management system.

One or more specific embodiments of the present invention will be described below. These described embodiments are only exemplary of the present invention. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The present disclosure is directed to embodiments of an additive management system configured to determine and monitor one or more conditions of a hydrocarbon extraction system, such as a hydrate condition (e.g., hydrate formation). In order to determine and monitor the hydrate condition, the additive management system includes a controller that receives feedback (e.g., data) from one or several flow meters, sensors, chemical injection metering valves, etc. of the hydrocarbon extraction system. The controller or another device (e.g., computer) uses the feedback in algorithms, modeling programs, and/or lookup tables to determine the hydrate condition. For example, the controller may determine a likelihood of hydrate formation based on an analysis of the feedback.

Additionally, in certain embodiments, the additive management system may be configured to provide recommendations to a user based on the hydrate condition (e.g., hydrate formation is likely to occur) to reduce or block hydrate formation. For example, the additive management system may provide recommendations to adjust an amount or flow rate of an injected hydrate inhibitor. In some embodiments, the additive management system may automatically adjust an amount or flow rate of an injected hydrate inhibitor to reduce or block hydrate formation. Furthermore, the additive management system may enable precise and/or targeted monitoring and/or control of hydrate formation throughout the hydrocarbon extraction system. In particular, the additive management system may provide recommendations and/or adjustments for the hydrate inhibitor injection that are specific for and/or tailored for one or more specific locations in the hydrocarbon extraction system. For example, the additive management system may be configured to distribute hydrate inhibitor (or another injected chemical)

Further, in some embodiments, the additive management system may be configured to inject a chemical into a fluid flow of the hydrocarbon extraction system and to determine a ratio of the injected chemical to relative water in the fluid flow. For example, the additive management system may inject one or more chemicals, such as hydrate inhibitors (e.g., thermodynamic inhibitors and/or kinetic inhibitors), pH modifiers, and/or scale inhibitors. The additive management system may determine the ratio of the injected chemical relative to water based at least in part on feedback from one or more optical sensors, feedback from one or more conductivity sensors, or a combination thereof. Additionally, the additive management system may be configured to provide recommendations to adjust the flow rate and/or amount of the injected chemical or to automatically adjust the flow rate and/or amount of the injected chemical based on the ratio of the injected chemical relative to water. For example, the additive management system may compare the ratio to a threshold (e.g., above a lower threshold or below an upper threshold) or threshold range (e.g., between upper and lower thresholds) and may provide recommendations to adjust or may automatically adjust the flow rate and/or amount of the injected chemical based on the comparison.

FIG. 1 is a schematic view of an embodiment of a hydrocarbon extraction system 10 with an additive management system 12 that determines and monitors one or more parameters or conditions of the hydrocarbon extraction system 10. For example, as described in more detail below, the additive management system 12 may determine or monitor a hydrate condition (e.g., hydrate formation) and/or a ratio or proportion of a chemical (e.g., a hydrate inhibitor) relative to water in a fluid flow. Additionally, as described in more detail below, the additive management system 12 may provide recommendations to a user, monitoring system, or control system relating to recommended adjustments for one or more parameters of the hydrocarbon extraction system 10 and/or may automatically adjust one or more parameters of the hydrocarbon extraction system 10 based on the determined parameters and conditions of the hydrocarbon extraction system 10 (e.g., via a control system). Further, the additive management system 12 may enable precise and/or targeted monitoring and/or control of parameters and conditions throughout the hydrocarbon extraction system 10. In order to monitor and/or control the one or more parameters and/or conditions of the hydrocarbon extraction system 10, the additive management system 12 may include sensors 14 (e.g., conductivity probes, solid particulate sensors, temperature sensors, pressure sensors, optical sensors, salinity sensors, water sensors, etc.), chemical injection metering valves (CIMV) 16, hydrate inhibitor regeneration systems 18, flow meters 20 (e.g., wet-gas flow meter, multi-phase flow meter), fluid control devices 22, and control systems 24.

As illustrated, the hydrocarbon extraction system 10 may include one or more wellhead systems 26 with a wellhead 28 coupled to a production tree 30 (e.g., Christmas tree). The wellhead systems 26 couple to a well 32 that enables hydrocarbon extraction (e.g., oil and/or natural gas) from a subterranean reservoir 34. As the hydrocarbons exit the well 32, the wellhead system 26 may direct the hydrocarbons to the surface through risers 36 for collection and/or processing at a rig 38 or shore facility. In some embodiments, multiple wells 32 may be part of the hydrocarbon extraction system 10. These wells 32 and wellhead systems 26 may couple to a manifold 40 with a jumper system 42 (e.g., jumper cables, pipes, etc.). Accordingly, the rig 36 or shore facility may then couple to the manifold 40 enabling fluid communication with multiple wells 32.

During extraction operations, additional substances (e.g., water and sediment) may flow out of the wells 32 with the hydrocarbon fluid flow. As the water moves with the hydrocarbons, water (e.g., freezing water) and natural gas components may combine to form hydrates due to high pressures and low temperatures in the hydrocarbon extraction environment. However, as described below, the additive management system 12 may monitor a hydrate condition (e.g., hydrate formation) of the hydrocarbon extraction system 10 and may reduce, block, or inhibit formation of the hydrates by injecting hydrate inhibitors (e.g., mono-ethylene glycol, methanol, kinetic hydrate inhibitors, anti-agglomerates, etc.) in the hydrocarbon extraction system 10.

As illustrated, in some embodiment of the disclosure, the additive managements system 12 includes in some embodiment of the disclosure, one more CIMVs 16 that inject one or more chemicals into the fluid flow coming out of the wells 32. For example, one or more CIMVs 16 may inject hydrate inhibitors (e.g., mono-ethylene glycol, methanol, kinetic hydrate inhibitors, thermodynamic inhibitors, anti-agglomerates), pH modifiers, and/or scale inhibitors. In some embodiments, each wellhead system 26 (e.g., each branch of the Christmas tree 30 and/or each wellhead 28) may include a respective CIMV 16 for chemical injection. In certain embodiments, the manifold 40 may also include one or more CIMVs 16 that inject chemicals. In some embodiments, hydrocarbon extraction system 10 may include CIMVs 16 in one or more of the wellhead systems 26, the riser 36, the manifold 40, and/or other locations in the hydrocarbon extraction system 10.

By including CIMVs 16 in each of the wellhead systems 26 and/or at other locations in the hydrocarbon extraction system 10, the additive management system 12 is able to tailor/control (e.g., provide an appropriate amount—not too much, not too little of) the flow of chemicals (e.g., hydrate inhibitors) in different areas of the hydrocarbon extraction system 10. That is, the additive management system 12 may be configured to control a plurality of CIMVs 16, which may be disposed in different locations (e.g., different wellhead systems 26, the riser 36, the manifold 40, etc.) of the hydrocarbon extraction system 10, and the additively management system 12 may be configured to control two or more CIMVs 16 or each CIMV 16 of the plurality of CIMVs 16 differently to provide a differential distribution of chemicals at the various locations. For example, the additive management system 12 may cause a first CIMV 16 to inject a first amount and/or first flow rate of a chemical and may cause a second CIMV 16 to inject a second amount and/or second flow rate of a chemical that is different from the first amount and/or first flow rate. Further, as will be described in more detail below, the additive management system 12 may monitor hydrate formation for one or more locations of the hydrocarbon extraction system 10 and may determine an amount and/or flow rate of hydrate inhibitor to inject using each CIMV 16 of the one or more locations, and the amount and/or flow rate of the hydrate inhibitor may be specific for and/or optimized for the particular location. For example, some wells 32 may produce or have higher concentrations of water than other wells 32. In response, the additive management system 12 may control one or more CIMVs 16 to increase hydrate inhibitor injection at wellhead systems 26 that experience significant water flow, while controlling one or more different CIMVs 16 to reduce hydrate inhibitor injection at wellhead systems 26 that produce small amounts of water. Moreover, the additive management system 12 may account for environmental conditions that enable hydrate formation such as temperature, pressure, and salinity. For example, a first well 32 that is at a lower temperature and/or higher pressure than a second well 32 may receive more hydrate inhibitor injection than the second well 32, because the temperatures and/or pressures at the first well 32 are more likely to produce hydrates. In other words, the additive management system 12 may control one or more CIMVs 16 to increase hydrate inhibitor injection at wells 32 that experience environmental conditions favorable to hydrate formation (e.g., low temperatures and/or high pressures) and/or may control one or more CIMVs 16 to reduce hydrate inhibitor injection at wells 32 that do not.

As explained above, the additive management system 12 may include a variety of sensors 14 (e.g., conductivity probes, solid particulate sensors, temperature sensors, pressure sensors, optical sensors, salinity sensors, water sensors, etc.) and flow meters 20 (e.g., wet-gas flow meters, multi-phase flow meters). The sensors 14 may measure one or more conditions and/or parameters of the hydrocarbon extraction system 10. For example, as will be described in more detail below, the sensors 14 may measure and/or generate feedback relating to temperature, pressure, salinity, conductivity, electromagnetic radiation, attenuation of one or more wavelengths of light, water content (e.g., water cut) in a fluid flow, or any other suitable parameter. Additionally, the flow meters 20 may measure the flow rate of a fluid (e.g., flow). In some embodiments, the multi-phase flow meters 20 may measure the full three-phase performance over the entire gas volume fraction (GVF) and water liquid ratio (WLR) ranges.

The sensors 14 and the flow meters 20 may be placed in different locations in the hydrocarbon extraction system 10. For example, in some embodiments, the sensors 14 and/or the flow meters 20 may be disposed in one or more of the wellhead systems 26 (e.g., each wellhead system 26), the manifold 40, the riser 36, the pipes of the jumper system 42, and/or other locations in the hydrocarbon extraction system 10. In certain embodiments, the sensors 14 and/or flow meters 20 may be mounted on a pipe section downstream of a bend, change in cross-sectional area, or other point to facilitate a liquid rich area. In some embodiments, at least one sensor 14 and/or at least one flow meter 20 may be disposed proximate to (e.g., upstream and/or downstream of) each CIMV 16.

By placing the sensors 14 and the flow meters 20 about different locations of the hydrocarbon extraction system 10, the additive management system 12 may measure or determine parameters and/or conditions in the hydrocarbon extraction system 10 at each location and may enable the control systems 24 to accurately control injection of one or more chemicals (e.g., hydrate inhibitors) at each location based on the parameters and/or conditions at the respective location. That is, the amount and/or flow rate of chemical injected may be individualized and/or specific for each CIMV 16 and/or for each desired location of the hydrocarbon extraction system 10 (e.g., each wellhead system 26, the Christmas tree 30, the riser 36, the manifold 40, the jumper system 42, or any combination thereof) based on the parameters and/or conditions in a region proximate to each CIMV 16 and/or at each desired location. For example, in some embodiments, the control systems 24 may use feedback (e.g., signals) from the sensors 14 and/or the flow meters 20 to determine a hydrate condition for one or more locations (e.g., each location) having the sensors 14 and/or flow meters 20, and the control systems 24 may determine an amount and/or flow rate of hydrate inhibitor to inject using one or more CIMVs 16 (e.g., each CIMV 16) based at least in part on the hydrate condition for the location proximate to the respective CIMV 16.

Figure 2:
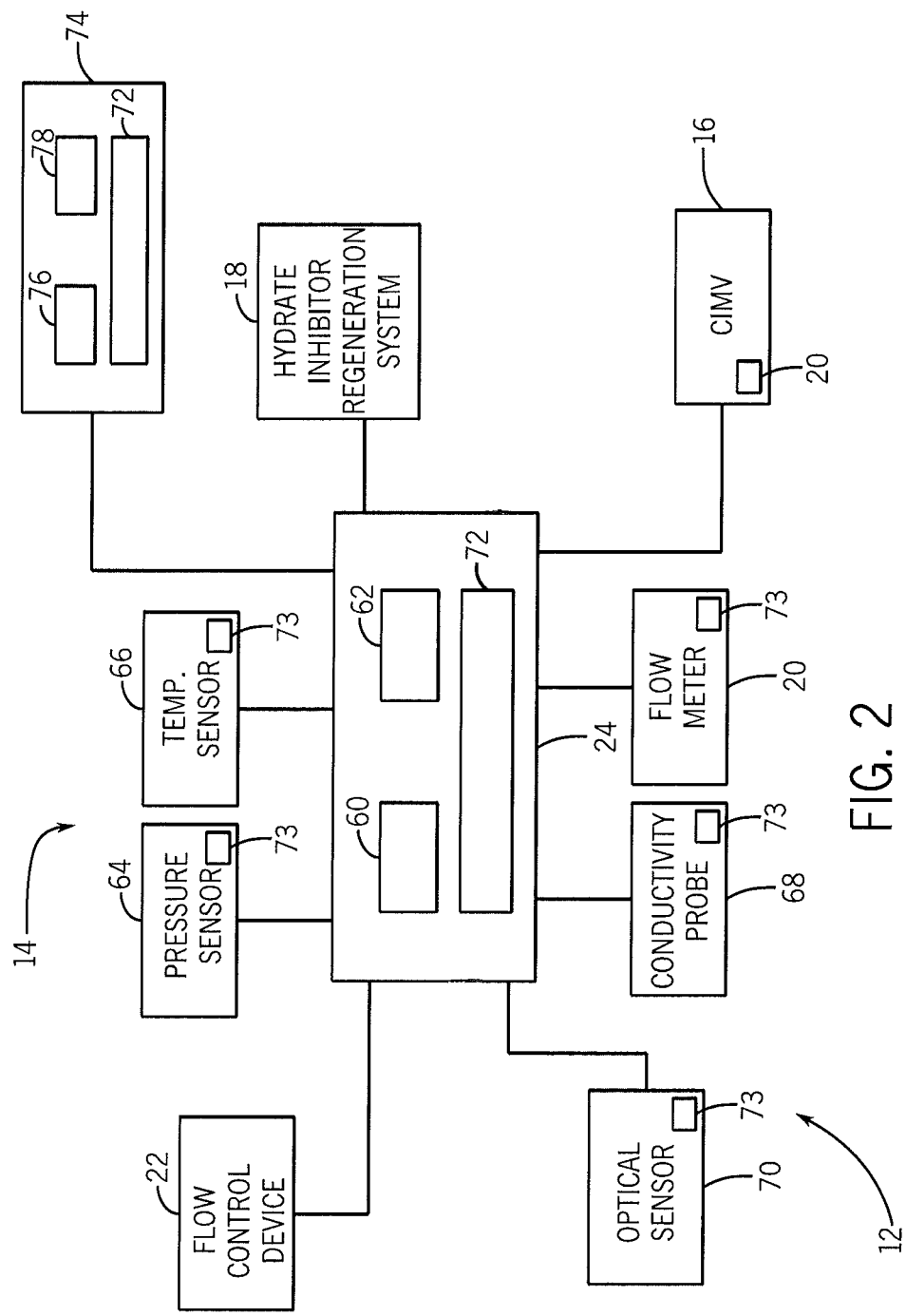
FIG. 2 is a schematic view of an embodiment of an additive management system.

FIG. 2 is a schematic view of an embodiment of an additive management system 12. As illustrated, the additive management system 12 includes one or more control systems 24 that communicate with and/or control various sensors 14, flow meters 20, flow control device 22 (e.g., choke), CIMVs 16, and hydrate inhibitor regeneration systems 18. As will be explained in detail below, the control system (e.g., controller) 24 includes one or more processors 60 that execute instructions stored by one or more memories 62 (e.g., tangible, non-transitory memory devices) to control the additive management system 12. During operation, the controller 24 may receive feedback from the various sensors 14, such as one or more pressure sensors 64, one or more temperature sensors 66, one or more conductivity probes (e.g., conductivity sensors) 68, and/or one or more optical sensors 70. In some embodiments, the pressure sensor 64 and the temperature sensor 66 may be combined (e.g., a pressure and temperature transmitter (PTTx)). Additionally, the controller 24 may receive feedback from the various flow meters 20 (e.g., wet-gas flow meter, multi-phase flow meter). The controller 24 may be operatively coupled to the sensors 14 and the flow meters 20 via any suitable communication link, such as, for example, RS-422, RS-435, RS-485, Ethernet, controller area network (CAN) (e.g., CAN bus, CANopen), optical fibers, and/or wireless communication.

The controller 24 may determine measurement data (e.g., real-time or substantially real-time measurement data) based on the feedback from the sensors 14 and/or the feedback from the flow meters 20. For example, the measurement data may include one or more conditions (e.g., environmental conditions) of the hydrocarbon extraction system 10, such as pressure and/or temperature. Additionally, the measurement data may include one or more flow characteristics (e.g., flow parameters) of a fluid flow in the hydrocarbon extraction system 10, such as flow rate (e.g. mass flow rate), fluid density, salinity, composition, concentration, and so forth. In particular, the controller 24 may determine flow characteristics of the process fluid (e.g., the hydrocarbon flow) upstream of a chemical injection point and/or flow characteristics of the process fluid downstream of a chemical injection point after mixing with the injected chemical. For example, as will be described below in FIGS. 3-5, the additive management system 12 may include sensors 14 and/or flow meters 20 that are disposed upstream and/or downstream of a CIMV 16. In some embodiments, the controller 24 may use the feedback from the upstream and the downstream sensors 14 and/or flow meters 20 to determine one or more flow parameters. For example, the controller 24 may compare measurements upstream and downstream to determine a ratio of an injected chemical relative to water, content of water, etc.

Further, it should be noted that the controller 24 may determine flow characteristics for one or more components of a fluid flow. For example, the fluid flow may include water, oil, gas, hydrogen sulfide, carbon dioxide, nitrogen, salts, and/or one or more injected chemicals (e.g., hydrate inhibitors, pH modifiers, scale inhibitors, etc.). In some embodiments, the controller 24 may determine the flow rate (e.g., mass flow rate) and/or fluid density for one or more components of the fluid flow.

In certain embodiments, the controller 24 may determine an amount, proportion, percentage, or concentration of one or more components in the fluid flow relative to the total fluid flow. For example, the controller 24 may determine the water content (e.g., water cut) in the fluid flow, which may be a proportion, percentage, or concentration of water relative to the fluid flow. Additionally, the controller 24 may be configured to determine an injected chemical content in the fluid flow, which may be a proportion, percentage, or concentration of the injected chemical relative to the fluid flow. However, it should be appreciated that the controller 24 may be configured to determine the percentage of any suitable component in the fluid flow. In some embodiments, the controller 24 may determine the amount (e.g., proportion, percentage, or concentration) of one or more components in the fluid flow relative to the total fluid flow based on feedback from one or more conductivity probes 68. For example, the one or more conductivity probes 68 may be microwave open-ended coaxial probes. In certain embodiments, the one or more conductivity probes 68 may be conductivity probes as described in U.S. Pat. No. 6,831,470, which is incorporated by reference in its entirety herein for all purposes, and the controller 24 may use any of the methods and techniques described in U.S. Pat. No. 6,831,470 for processing signals from the conductivity probe to determine the amounts of the components in a fluid. For example, in one embodiment, the conductivity probe 68 may generate an alternating current electrical signal (e.g., a reference signal), which may be reflected by the fluid and detected by the conductivity probe (e.g., reflected signal). The reflected signal may be compared to the reference signal to determine the electromagnetic properties of the fluid, which may be used to determine the amount of one or more components in the fluid flow (e.g., using one or more algorithms, models, look-up tables, etc.). For example, the amplitude attenuation and phase shift between the reference signal and the reflected signal may be used to derive the complex reflection coefficient of the fluid flow, the fluid conductivity, and/or the fluid permittivity.

In some embodiments, the controller 24 may determine the amount (e.g., proportion, percentage, or concentration) of one or more components in the fluid flow relative to the total fluid flow based on feedback from one or more optical sensors 70. The optical sensors 70 may be infrared, reflectance-type sensors. In some embodiments, the optical sensors 70 may be configured to emit light in the mid-wavelength infrared region, the long-wavelength infrared region, and/or the far-infrared region. For example, the optical sensors 70 may be configured to emit one or more wavelengths of light in the range of 2 micrometers ($\mu m$) to 50 $\mu m$, 2.5 $\mu m$ to 15 $\mu m$, 3 $\mu m$ to 12 $\mu m$, or any other suitable range. In particular, the optical sensors 70 may be configured to emit light at one or more wavelengths corresponding to absorption peaks of one or more components in the fluid. For example, the optical sensor 70 may emit a first wavelength of light with an absorption peak for water, a second wavelength of light with an absorption peak for an injected chemical (e.g., hydrate inhibitor), a third wavelength of light with an absorption peak for oil, and so forth. Additionally, the optical sensors 70 may be configured to detect light (e.g., in the mid-wavelength infrared region, the long-wavelength infrared region, and/or the far-infrared region) after the emitted light has interacted with the fluid flow. In some embodiments, the optical sensors 70 may be configured to emit and detect a plurality of wavelengths of light corresponding to various substances in the fluid flow. The controller 24 may be configured to determine the amounts of one or more components in the fluid flow based on the detected light (e.g., reflected light).

Further, by using the conductivity probes 68 and/or the optical probes 70, the controller 24 may be configured to detect very low amounts of water in the fluid flow. For example, the controller 24 may detect water in a fluid flow when the water content is between approximately 10 parts per million (ppm) and 500 ppm, 30 ppm and 250 ppm, or 50 ppm and 100 ppm. In some situations, the water content may not be measurable (e.g., water concentration below the level measured by sensors). In these situations, the controller 24 may use a modeling program (e.g., computer-based modeling program, physics-based modeling program) to predict the amount of water flowing through the hydrocarbon extraction system 10. Additionally, as will be described in more detail below, in certain embodiments, the controller 24 may determine an amount, proportion, percentage, or concentration of one or more components in the fluid flow relative to one or more other components in the fluid flow based on feedback from the conductivity probes 68, feedback from the optical sensors 70, or both. For example, the controller 24 may be configured to determine a ratio of an injected chemical relative to water in the fluid flow.

Additionally, in some embodiments, the controller 24 may be configured to receive feedback from the sensors 14 and/or the flow meters 20 for verification and/or redundancy purposes. For example, the controller 24 may be configured to receive feedback from a conductivity probe 68 and feedback from an optical sensor 70 that are disposed proximate to one another in the same general location in the hydrocarbon extraction system 10 such that the flow characteristics of the fluid as it flows by the conductivity probe 68 are substantially the same as the flow characteristics of the fluid as it flows by the optical sensor 70. In this manner, if the conductivity probe 68 fails or malfunctions, the controller 24 may still determine parameters (e.g., the water content and injected chemical content) based on feedback from the optical sensor 70 and vice versa. In this manner, the conductivity probe 68 and the optical sensor 70 may be redundant.

Further, the controller 24 may be configured to compare one or more parameters determined based on feedback from the conductivity probe 68 to the same one or more parameters determined based on feedback from the optical sensor 70 to verify and/or reduce uncertainty in the determined parameters. For example, the controller 24 may compare a first value of the water content and a first value of the injected chemical content determined based on feedback from the conductivity probe 68 to a second value of the water content and a second value of the injected chemical content, respectively, determined based on feedback from the optical sensor 70. In some embodiments, the controller 24 may determine a difference between a first value of a parameter determined from feedback from the conductivity probe 68 and a second value of the parameter determined from feedback from the optical sensor 70 and may compare the difference to the threshold, which may be stored in the memory 62. In certain embodiments, the controller 24 may determine a level of certainty for the determined measurement based on the comparison. In some embodiments, the controller 24 may be configured to provide a warning or an alarm in response to a determination that the difference is greater than the threshold, which may be indicative of an undesirably high level of uncertainty for the determined and/or may be indicative of a failure or malfunction of the conductivity probe 68 and/or the optical sensor 70. For example, the controller 24 may be operatively coupled to a user interface 72, which may include a display and/or a speaker, and may cause the user interface 72 to provide the warning or alarm.

Still further, in some embodiments, each CIMV 16 may include a flow meter 20 to generate feedback relating to the chemical injection flow rate. In one embodiments, each CIMV 16 may include an ultrasonic flow meter 20 configured to measure a range of flow rates between approximately 0.5 liters per hour to 26,500 liters per hour, or more. As noted above, the controller 24 may control each CIMV 16 to inject a chemical at a designated or assigned injection rate. To verify that each CIMV 16 is injecting the chemical at its respective assigned injection rate, the controller 24 may compare the assigned injection rate to an injection rate determined based on feedback from the flow meter 20 of the respective CIMV 16 to confirm or verify the actual injection rate of the chemical. In some embodiments, the controller 24 may provide a warning or alarm (e.g., via the user interface 72) if a difference between the assigned injection rate and the determined injection rate is greater than a threshold, which may be stored in the memory 62. For example, a difference that is greater than the threshold may be indicative of a failure or malfunction of the CIMV 16.

As noted above, the sensors 14 and the flow meters 20 may be disposed about in a plurality of different locations of the hydrocarbon extraction system 10. To enable targeted monitoring and/or control of parameters and conditions of the hydrocarbon extraction system 10 in the different locations, the controller 24 may be configured to associate feedback from each sensor 14 and feedback from each flow meter 20 with the location of the respective sensor 14 or flow meter 20. For example, in some embodiments, each sensor 14 and each flow meter 20 may be coupled to the controller 24 via an individual channel or a separate pinout in a multibus, and the controller 24 may determine the location of the feedback from each sensor 14 and each flow meter 20 based on the channel or pinout from which the controller 23 received the feedback. In certain embodiments, one or more of the sensors 14 and one or more of the flow meters 20 may include a tag or memory device 73, which may be configured to store information about the respective sensor 14 or flow meter 20. For example, the tag or memory device 73 may store identification information (e.g., an identification number, a unique identification number, etc.) and/or location information. The sensors 14 and the flow meters 20 may be configured to transmit the information from the tag or memory device 73 to the controller 24 with the generated feedback, and the controller 24 may determine the location of the sensors 14 and the flow meters 20, and therefore the generated feedback, based on the information. In some embodiments, the memory 62 may store a lookup table or database linking the information to the respective location, and the controller 24 may access the lookup table or database using the information to determine the location. It should be appreciated that the above-mentioned examples are not intended to be limiting, and any suitable techniques for determining the location of the sensors 14 and the flow meters 20 may be used.

The controller 24 may use the determined measurement data to determine one or more hydrate conditions for the hydrocarbon extraction system 10. In some embodiments, the controller 24 may determine a plurality of hydrate conditions for a plurality of locations about the hydrocarbon extraction system 12 using the measurement data from the plurality of sensors 14 and flow meters 20 and the information stored in the tags 73 of the sensors 14 and flow meters 20. For example, the controller 24 may determine a hydrate condition for each wellhead system 26, a hydrate condition for one or more locations about the riser 36 (e.g., at different depths along the riser 36), a hydrate condition for the manifold 40, a hydrate condition for one or more locations about the pipes of the jumper system 42, and so forth.

In order to determine the one or more hydrate conditions (e.g., whether the water in the fluid flow will form or is likely to form hydrates), the controller 24 may be configured to use the measurement data with one or more modeling programs, algorithms, hydrate formation curves, look-up tables, databases, or any combination thereof. For example, the controller 24 may include one or more modeling programs, algorithms, hydrate formation curves, look-up tables, and/or databases stored in the memory 62 that the processor 60 executes or accesses to determine hydrate formation. In some embodiments, the controller 24 may communicate with another computer(s) 74 that include one or more processors 76 and one or more memories 78 that run the modeling programs, algorithms, hydrate formation curves, look-up tables, and/or databases. In some embodiments, the computer 74 may receive the measurement data directly from the sensors 14, flow meters 20, etc. and/or from the controller 24.

In particular, the modeling programs, algorithms, hydrate formation curves, look-up tables, and/or databases may predict or estimate the likelihood of hydrate formation (e.g., the hydrate condition) based on different values of at least one parameter of the hydrocarbon extraction system 10. For example, the modeling programs, algorithms, hydrate formation curves, look-up tables, and/or databases may predict or estimate the likelihood of hydrate formation based on one or more parameters of a hydrocarbon fluid flow, such as temperature, pressure, flow rate (e.g., flow rate of water, flow rate of oil, flow rate of gas), fluid density, salinity, composition (e.g., relative amounts of oil, gas, water, carbon dioxide, hydrogen sulfide, nitrogen, hydrate inhibitor, or any other component), water content, and/or hydrate inhibitor content. In some embodiments, the modeling programs, algorithms, hydrate formation curves, look-up tables, and/or databases may define one or more boundary conditions for the one or more parameters such that values of the one or more parameters (e.g., alone or in combination with other parameters) that meet or violate the one or more boundary conditions are likely to result in hydrate formation.

In certain embodiments, the memory 62 and/or the memory 78 may store a plurality of modeling programs, algorithms, hydrate formation curves, look-up tables, and/or databases that each predict or estimate the likelihood of hydrate formation based on a different parameter or a different combination of parameters. By way of example, the memory 62 may store a first modeling program that estimates the likelihood of hydrate formation based on temperature, a second modeling program that estimates the likelihood of hydrate formation based on temperature and pressure, a third modeling program that estimates the likelihood of hydrate formation based on temperature, pressure, and water content, and a fourth modeling program that estimates the likelihood of hydrate formation based on temperature, pressure, water content, and hydrate inhibitor content. In such embodiments, the controller 24 may be configured to select a modeling program, algorithm, hydrate formation curve, look-up table, and/or database based on the parameters determined by the controller 24 using the feedback from the sensors 14 and flow meters 20. For example, the controller 24 may select the second modeling program if the controller 24 determines pressure and temperature and may select the third modeling program if the controller 24 determines pressure, temperature, and water content. In some embodiments, the memory 62 and/or the memory 78 may also store a level of certainty for each of the plurality of modeling programs, algorithms, hydrate formation curves, look-up tables, and/or databases, which may increase with the number of parameters used by the respective modeling program, algorithm, hydrate formation curve, look-up table, or database. That is, the determination of hydrate formation may have a higher level of certainty when more information (e.g., more parameters) is used. Further, in some embodiments, the memory 62 may store a plurality of modeling programs that model different states of the hydrocarbon extraction system 10. For example, the modeling programs may model start-up, steady-state, look ahead scenarios (e.g., planned shut-in, unplanned shut-in, shut down, etc.), among others. Further, in some embodiments, the modeling programs may include a real-time transient production simulator configured to enable presentation of flow variables in real time between points of measurements. In some embodiments, the real-time transient production simulator can be used for forecasting and providing what-if scenarios from current conditions, yielding live estimates of cool-down times, no-touch times, and other information for hydrate management. Further, alarms (e.g., alarms triggered by the real-time transient production simulator, alarms triggered by the modeling programs, etc.) may be configured to notify control room operators of potential operational issues before they occur.

In operation, the controller 24 (or the computer 74) may determine the value of at least one parameter of the hydrocarbon extraction system 10 based on feedback from at least one sensor 14, feedback from at least one flow meter 20, or both, and may use the value of the at least one parameter in at least one modeling program, algorithm, hydrate formation curve, look-up table, or database to determine the hydrate conditions (e.g., the likelihood of hydrate formation). As noted above, in some embodiments, the controller 24 may select a modeling program, algorithm, hydrate formation curve, look-up table, or database based on the parameters determined by the controller 24. Additionally, if the controller 24 determines that hydrate formation is likely, the controller 24 may determine an amount and/or flow rate of a hydrate inhibitor to inject to reduce or block hydrate formation. In some embodiments, the controller 24 may use the modeling program, algorithm, hydrate formation curve, look-up table, and/or database to determine the amount and/or flow rate of the hydrate inhibitor to inject based on the hydrate condition. For example, the controller 24 may input one or more values of one or more parameters into a modeling program, and the modeling program may output both the hydrate condition and an amount and/or flow rate of hydrate inhibitor to inject based on the hydrate condition.

In some embodiments, the controller 24 may be configured to execute one or more algorithms to determine an amount and/or a flow rate of hydrate inhibitor to inject based on the hydrate condition. For example, in one embodiment, the controller 24 may be configured to use the Hammerschmidt equation, which is provided below:

$$x = \frac{d \times M \times 100}{K + d \times M},$$

where x is the concentration of the hydrate inhibitor in weight percent, d is the depression of the hydrate point in degrees Celsius, M is the molecular weight of the hydrate inhibitor, and K is a dimensionless constant for the particular hydrate inhibitor. In particular, the controller 24 may determine a desired depression of the hydrate point (i.e., d) to reduce or block hydrate formation based on the determined hydrate condition, and the controller 24 may determine (e.g., solve for) the concentration of hydrate inhibitor to inject based on the desired depression of the hydrate point. In some embodiments, the controller 24 may determine the flow rate (e.g., mass flow rate) of hydrate inhibitor to inject based on the determined concentration of hydrate inhibitor and the flow rate (e.g., mass flow rate) of water in the fluid flow. The hydrate inhibitor may be become diluted after it is injected into the hydrocarbon fluid flow and mixes with other substances, which may decrease the concentration of the hydrate inhibitor and may decrease the effectiveness of the hydrate inhibitor. The diluted hydrate inhibitor may be referred to as rich hydrate inhibitor, while the higher purity hydrate inhibitor (e.g., the hydrate inhibitor reclaimed using the hydrate inhibitor regeneration systems 18 and/or the hydrate inhibitor injected using the CIMVs 16) may be referred to as lean hydrate inhibitor. In some embodiments, x may be the concentration of the rich hydrate inhibitor, and the controller 24 may determine the mass flow of hydrate inhibitor to inject based on the mass flow of water, the concentration of the rich hydrate inhibitor, and the concentration of lean hydrate inhibitor, which may be known or determined from the hydrate inhibitor regeneration systems 18. For example, the controller 24 may determine the mass flow of hydrate inhibitor to inject using the following equation:

$$m_I = m_W \times \left( \frac{x}{x_L - x} \right),$$

where $m_I$ is the mass flow of the hydrate inhibitor (e.g., kg/d), $m_W$ is the mass flow of water (e.g., kg/d), x is the concentration of the rich hydrate inhibitor (e.g., weight percent), and $x_L$ is the concentration of the lean hydrate inhibitor (e.g., mass percent).

Further, the controller 24 and/or the computer 74 may determine hydrate condition and the amount and/or flow rate of hydrate inhibitor to inject for a plurality of locations about the hydrocarbon extraction system 10. For example, the controller 24 may determine hydrate condition and the amount and/or flow rate of hydrate inhibitor to inject for each area or region including a CIMV 16. In some embodiments, the controller 24 (e.g., using the modeling programs) may be configured to forecast or extrapolate measurement data (e.g., determined from the sensors 14 and the flow meters 20) to determine hydrate conditions and/or amounts and/or flow rates of hydrate inhibitor to inject for other locations of the hydrocarbon extraction system 10 that do not include the sensors 14 and/or the flow meters 20. However, the forecasted or extrapolated information may have a lower level of certainty than the measurement data, but may be helpful in controlling hydrate conditions throughout the entire hydrocarbon extraction system 10 with a limited number of sensors 14.

If the controller 24 and/or the computer 74 determines that hydrate formation is likely or will be likely in a future scenario, the controller 24 and/or computer 74 may advise or warn an operator through the user interface 72. In particular, the controller 24 and/or the computer 72 may cause the user interface 72 to display an indication that hydrate formation is likely and to display a recommended amount and/or flow rate of hydrate inhibitor to inject to reduce or block the hydrate formation. As will be appreciated, in embodiments in which the additive management system 12 determines a hydrate condition and an amount and/or flow rate of hydrate inhibitor to inject for a plurality of locations about the hydrocarbon extraction system 10, the user interface 72 may also display an indication of the location for each hydrate condition and recommendation for the amount and/or flow rate of hydrate inhibitor to inject. In some embodiments, the user interface 72 may also display a level of certainty for the respective hydrate condition and/or recommended amount and/or flow rate of hydrate inhibitor to inject. For example, the level of certainty may be determined by the controller 24 and may be based on a level of certainty of the modeling program (or hydrate formation curve, look-up table, algorithm, database, etc.) used, as well as any redundant measurements (e.g., feedback from the conductivity probe 68 and feedback from the optical sensor 70, etc.) used by the controller 24. The operator may then provide instructions to the additive management system 12 to increase, start, decrease, and/or stop hydrate inhibitor injection through one or more CIMVs 16. In particular, the operator may provide instructions to the additive management system 12 to adjust hydrate inhibitor injection through the one or more CIMVs 16 using the recommended hydrate inhibitor injection settings (e.g., flow rate, amount, and/or location) determined by the controller 24 and/or the computer 74.

In some embodiments, the additive management system 12 may automatically adjust hydrate inhibitor injection based on sensor 14 and flow meter 20 feedback. In particular, the additive management system 12 may control one or more CIMVs 16 to automatically adjust hydrate inhibitor injection based on a determined amount and/or flow rate of hydrate inhibitor to inject to reduce or block a determined hydrate condition. Once the CIMVs 16 are activated, the controller 24 and/or computer 74 may monitor the amount of hydrate inhibitor injected into the fluid flow and may update the modeling programs based on the amount of hydrate inhibitor injected. For example, the controller 24 and/or the computer 74 may continue to monitor feedback from the sensors 14 and the flow meters 20 to determine updated hydrate conditions and to determine updated amounts and/or flow rates of hydrate inhibitor to inject. In some embodiments, the modeling programs may be smart or learning modeling programs that may be configured to learn based on historical data.

In some embodiments, the additive management system 12 may also be configured to monitor the hydrate inhibitor regeneration system 18. During operation, the hydrate inhibitor regeneration system 18 removes hydrate inhibitor from the fluid flow when it reaches the rig 38. As noted above, the concentration of the hydrate inhibitor entering the hydrate inhibitor regeneration system 18 may be rich from dilution with other substances, which reduces the effectiveness of the hydrate inhibitor. Thus, by separating the hydrate inhibitor from the fluid flow, the hydrate inhibitor regeneration system 18 may recover lean hydrate inhibitor that has a higher concentration than the rich hydrate inhibitor, which may reduce the amount of hydrate inhibitor used. In some embodiments, the hydrate inhibitor regeneration system 18 may be configured to determine the concentration of the rich and lean hydrate inhibitor. As noted above, by measuring the concentration (e.g., strength, potency) of the hydrate inhibitor before and after injection (e.g., rich and lean concentrations), the controller 24 may determine how much hydrate inhibitor should be injected to block hydrate formation. The controller 24 and/or computer 74 may also receive input from the hydrate inhibitor regeneration system 18 indicating how much hydrate inhibitor is available for use (e.g., the rich and lean hydrate inhibitor tank volume measurements) and the concentration (e.g., potency) of the hydrate inhibitor. This information may likewise be fed into the modeling programs enabling the modeling programs to provide feedback to an operator about whether there is enough hydrate inhibitor for future hydrate prevention scenarios (e.g., shut down, start up), warn a user to order more hydrate inhibitor, etc.

In some embodiments, the additive management system 12 may include flow control devices 22 (e.g. chokes) that facilitate mixing between the hydrate inhibitor and the fluid flowing out of the well 32. In some embodiments, the controller 24 may receive feedback from a sensor 14 and/or flow meter 20 that measures the concentration of hydrate inhibitor. If the measured concentration is more or less than the expected concentration based on feedback from the CIMV 16, the controller 24 may adjust the flow control device 22 to increase mixing between the hydrate inhibitor and the fluid flow.

Figure 3:
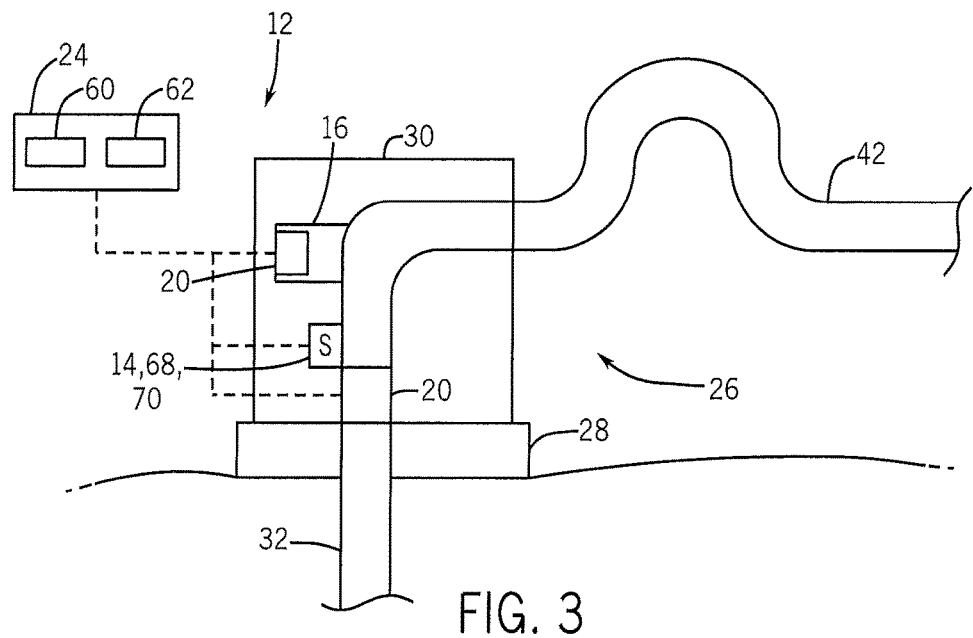
FIG. 3 is a schematic view of an embodiment of an additive management system coupled to a wellhead system.

FIG. 3 is a schematic view of an embodiment of the additive management system 12 coupled to a wellhead system 26. As explained above, the additive management system 12 enables precise and/or targeted control of the hydrate formation throughout the hydrocarbon extraction system 10, which reduces the amount of hydrate inhibitor used as well as the hydrate inhibitor infrastructure. Accordingly, FIG. 3 illustrates hydrate inhibitor injection into a specific wellhead system 26.

The additive management system 12 includes sensors 14, a flow meter 20, and a CIMV 16 that couple to a controller 24. In operation, the flow meter 20 measures the flow rate of fluid exiting the well 32. In some embodiments, the flow meter 20 may be a wet-gas flow meter or multi-phase flow meter capable of measuring a fluid flow rate as well as the concentration of water in the fluid flow. In addition, the controller 24 receives feedback from additional sensors 14. For example, the additive management system 12 may include a pressure sensor, a temperature sensor, a conductivity probe, a solid particulate sensor, and a salinity sensor among others that couple to the wellhead system 26. In some embodiments, the sensor 14 may be a conductivity probe 68 capable of measuring the concentrations of one or more components in the fluid flow. For example, in some embodiments, the conductivity probe 68 may be configured to measure low concentrations of water in the fluid flow. In certain embodiments, the sensor 14 may be an optical sensor 70, which may be configured to measure the concentrations of one or more components in the fluid flow, such as the concentration of water. Moreover, in some embodiments, the conductivity probe 68, the optical sensor 70, and/or a wet-gas/multiphase flow meter 20 may be placed before the CIMV 16 to block inclusion of the hydrate inhibitor in the measurement of water content of the fluid flow.

In operation, the controller 24 combines the information from the flow meter 20 (e.g., wet-gas flow meter, multiphase flow meter) and the sensors 14 to determine how much hydrate inhibitor should be injected into the fluid flow. As explained above, the flow meter 20 measures the flow rate of fluid exiting the well 32 while the sensors 14 measure one or more environmental conditions (e.g., pressure, temperature, water content, salinity, etc.). In some embodiments, the additive management system 12 may include a sensor 14 (e.g., conductivity probe 68 and/or optical sensor 70) configured to measure low concentrations of water in the fluid flow. In order to increase accurate measurement of the water content, the sensor 14 may be placed upstream from the CIMV 16 to block inclusion of the hydrate inhibitor in the water content measurement. In some embodiments, the additive management system 12 may also provide redundant measurement of hydrate inhibitor injection into the fluid flow. For example, the additive management system 12 may receive feedback from the CIMV 16 as well as a flow meter 20 (e.g., an ultrasonic flow meter) to measure the flow rate of the injected hydrate inhibitor. As noted above, the controller 24 may be configured to compare the flow rate measured by the flow meter 20 to the set injection rate of the CIMV 16 to determine whether the CIMV 16 is injecting the hydrate inhibitor at the correct rate. The flow meter 20 may be disposed in the CIMV 16, or may be disposed proximate to the CIMV 16 and directly upstream or downstream of the injected hydrate inhibitor such that the flow meter 20 receives the hydrate inhibitor before the hydrate inhibitor is injected into the fluid flow. In certain embodiments, the additive management system 12 may also include a sensor 14 (e.g., a conductivity probe 68, an optical sensor 70, etc.) to measure the concentration of hydrate inhibitor entering the fluid flow. In some embodiments, the flow meter 20 may be configured to measure the concentration of hydrate inhibitor entering the fluid flow. As explained above, by measuring the concentration (e.g., strength, potency) of the hydrate inhibitor before injection, the modeling programs are able to determine how much hydrate inhibitor should be injected to block hydrate formation. While FIG. 3 illustrates sensors 14 and the flow meter 20 coupled to the Christmas tree 30 (e.g., production tree), the sensors 14 and flow meter 20 may be coupled to other areas of the wellhead system 26 (e.g., wellhead 28, jumper system 42, etc.).

Figure 4:
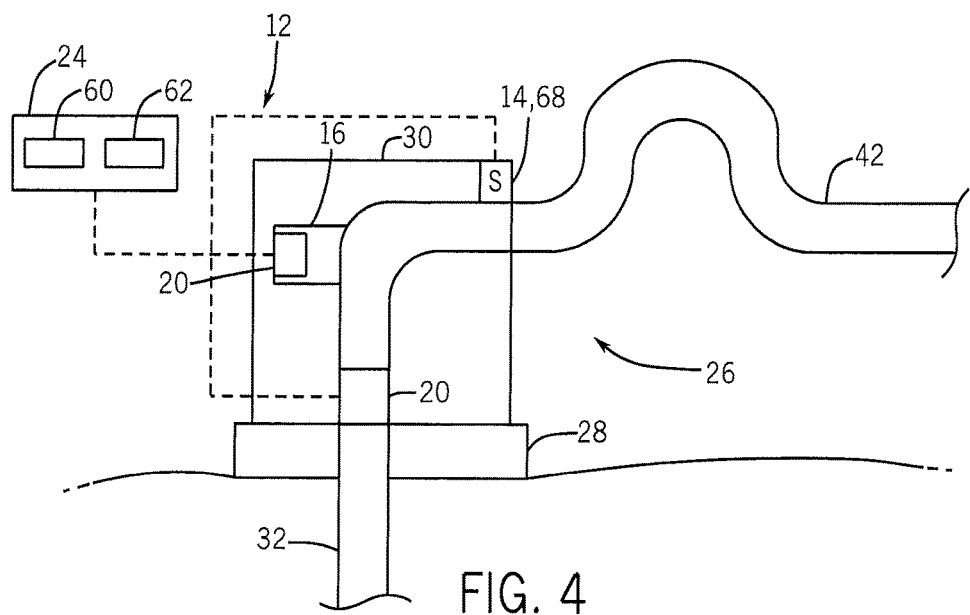
FIG. 4 is a schematic view of an embodiment of an additive management system coupled to a wellhead system.

FIG. 4 is a schematic view of an embodiment of the additive management system 12 coupled to a wellhead system 26. The additive management system 12 includes sensors 14, a flow meter 20, and a CIMV 16 that couple to a controller 24. In some embodiments, the additive management system 12 may include a sensor 14 (e.g., a conductivity probe 68 and/or an optical sensor 70) downstream of the CIMV 16 to measure one or more flow parameters of the fluid flow after mixing with a chemical injected via the CIMV 16. For example, the conductivity probe 68 and/or an optical sensor 70 may be configured to determine the water content, the hydrate inhibitor content, or an injected chemical content, as described above. In certain embodiments, the conductivity probe 68 and/or the optical sensor 70 may be configured to generate feedback that may be used by the controller 24 to determine a ratio of an injected chemical relative to water in the fluid flow. For example, the conductivity probe 68 may measure the electromagnetic properties of the mixed fluid (e.g., downstream of the CIMV 16) at two different electromagnetic frequencies. The controller 24 may be configured to compare signals from the conductivity probe 68 at each frequency to determine a ratio of an injected chemical relative to water in the fluid flow based on the frequency-dependence of the measured electromagnetic properties. The controller 24 may be configured to use one or more algorithms (e.g., to calculate the fluid conductivity, fluid permittivity, and/or complex reflection coefficient), look-up tables (e.g., including empirical data), models, and so forth to derive the ratio of the injected chemical relative to water based on the electromagnetic properties. In some embodiments, the controller 24 may compare signals at different wavelengths (e.g., two or more wavelengths) from the optical sensor 70 to determine a ratio of an injected chemical relative to water in the fluid flow. As will be described in more detail below, the controller 24 may be configured to adjust the injection rate of an injected chemical or to provide a recommendation to adjust the injection rate of an injected chemical to achieve a desired ratio of injected chemical to water in the fluid flow.

Figure 5:
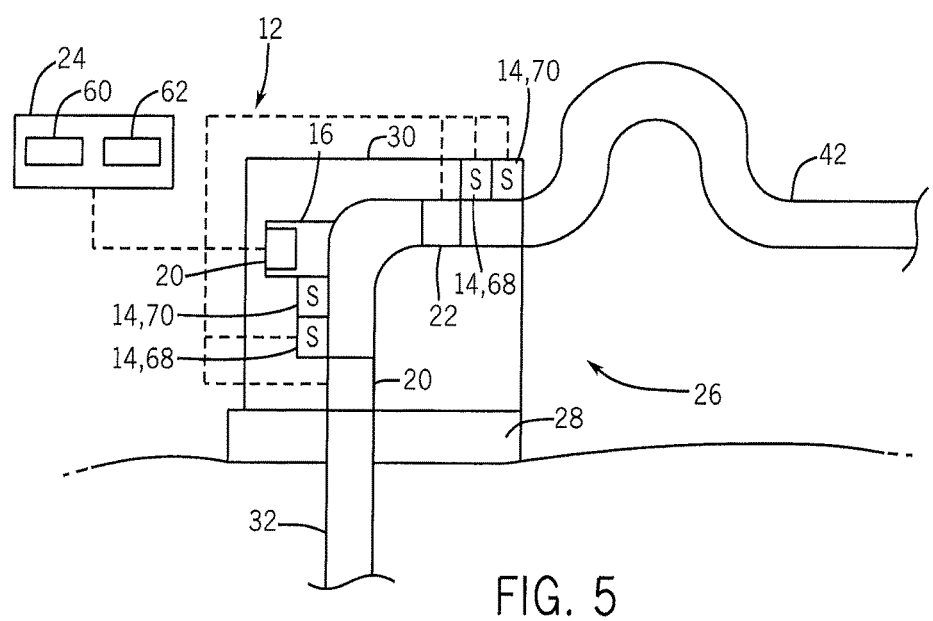
FIG. 5 is a schematic view of an embodiment of an additive management system coupled to a wellhead system.

FIG. 5 is a schematic view of an embodiment of a section of the additive management system 12 coupled to a wellhead system 26. The additive management system 12 includes sensors 14, a flow meter 20, a flow control device 22, and a CIMV 16 that couple to a controller 24. As illustrated, the additive management system 12 includes sensors 14 upstream and downstream of the CIMV 15. For example, the additive management system 12 may include an upstream conductivity probe 68 and a downstream conductivity probe 68 and/or an upstream optical sensor 70 and a downstream optical sensor 70. In this manner, the controller 24 may be configured to determine the water content in the fluid upstream of the CIMV 16, the water content in the fluid downstream of the CIMV 16, and the injected chemical content (e.g., the hydrate inhibitor content) in the fluid downstream of the CIMV 16. Further, the controller 24 may be configured to determine a ratio of an injected chemical relative to water in the fluid flow. For example, the controller 24 may determine or derive the electromagnetic properties of water based on feedback (e.g., a first signal) from an upstream conductivity probe 68. Additionally, the controller 24 may be configured to determine or derive the electromagnetic properties of a water-chemical mixture based on feedback (e.g., a second signal) from a downstream conductivity probe 68. Further, the controller 24 may be configured to compare the electromagnetic properties of the water with the electromagnetic properties of the water-chemical mixture to determine a ratio of injected chemical relative to water. Additionally or alternatively, the controller 24 may receive signals at multiple wavelengths from a downstream optical sensor 70, and the controller 24 may analyze the signals at the multiple wavelengths to determine a ratio of injected chemical relative to water. For example, the upstream optical sensor 70 and/or the downstream optical sensor 70 may each be configured to emit at least a first wavelength corresponding to an absorption peak of water and a second wavelength corresponding to an absorption peak of the injected chemical. In some embodiments, the controller 24 may be configured to determine the ratio of the injected chemical to water based on the measured absorbance at each wavelength, the path lengths of water and the injected chemical, and the absorption coefficients of water and the injected chemical (e.g., using Beer-Lambert's law).

In some embodiments, the additive management system 12 may include a flow control device 22. As explained above, the flow control devices 22 (e.g. chokes) facilitate mixing between the injected chemical (e.g., hydrate inhibitor) and the fluid flowing out of the well 32. In some embodiments, the controller 24 may use feedback from a sensor 14 (e.g., the conductivity probe 68 and/or the optical sensor 70) downstream from the flow control device 22 to determine whether the injected chemical has mixed adequately with the fluid flow. If mixing is inadequate, the controller 24 may adjust the flow control device 22 to increase mixing between the fluid flow and the injected chemical.

Figure 6:
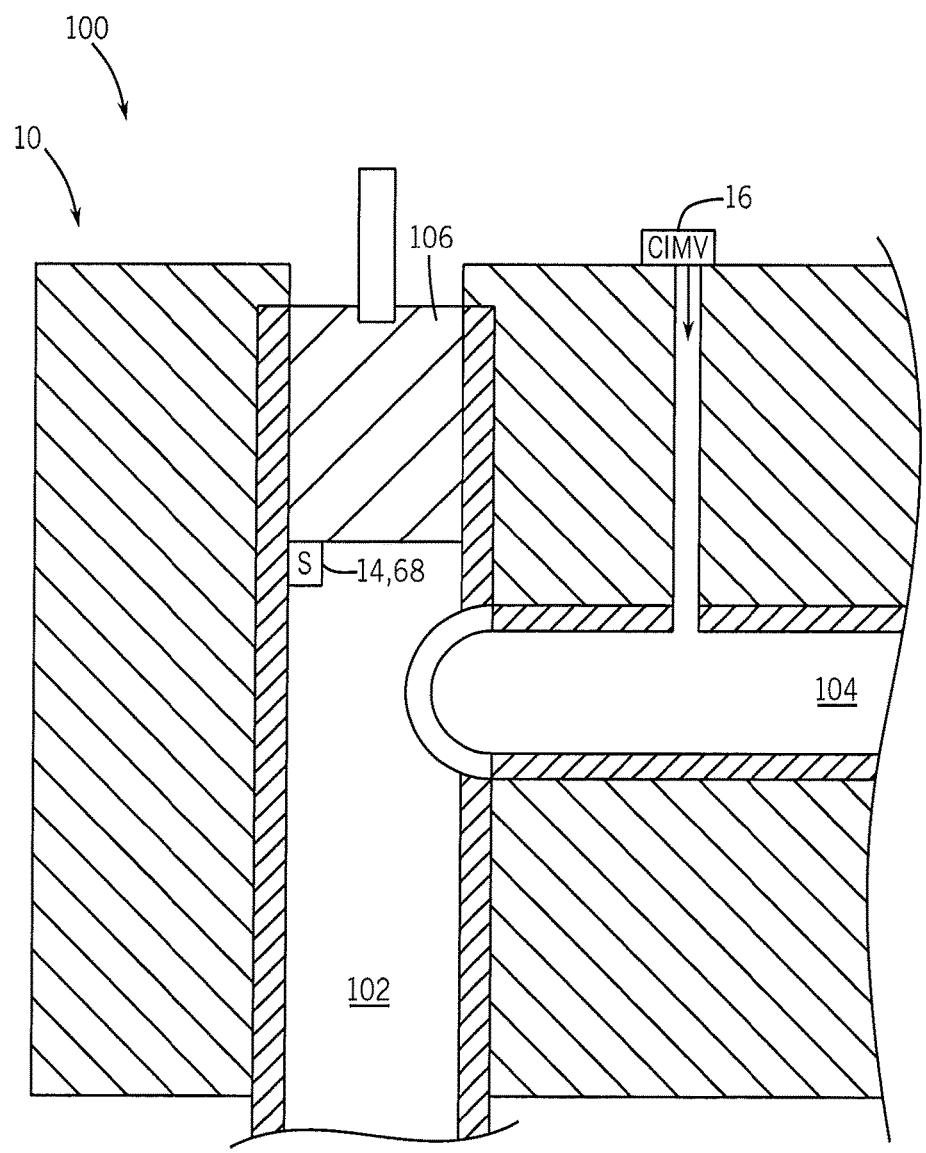
FIG. 6 is a cross-sectional view of an embodiment of a tubing hanger of a hydrocarbon extraction system including a sensor.

FIG. 6 is a cross-sectional view of an embodiment of a hanger 100 (e.g., a tubing hanger) of the hydrocarbon extraction system 10. The tubing hanger 100 may include a production bore 102 (e.g., a main bore) and an outlet passage 104 that branches off from the production bore 102. Additionally, the tubing hanger 100 may include a wireline plug 106 configured to seal the production bore 102 above the outlet passageway 104. Further, the tubing hanger 100 may include a CIMV 16 configured to inject a chemical into the outlet passageway 104. To measure one or more properties of the fluid flow (e.g., water content) upstream of the injection point, the tubing hanger 100 may include one or more sensors 14 (e.g., a conductivity probe 68) upstream of the injection point. In particular, a conductivity probe 68 may be disposed within the production bore 102. In some embodiments, the conductivity probe 68 may be disposed within the production bore 102 below the wireline plug 106. However, it should be appreciated that the additive management system 12 may include the sensors 14 in any suitable location about the tubing hanger 100, such as in the outlet passageway 104 upstream of the CIMV 16 and/or in the outlet passageway 104 downstream of the CIMV 16.

Providing sensors 14 in the tubing hanger 100 may be desirable because the sensors 14 may be removable or retrievable with the tubing hanger 100.

Figure 7:
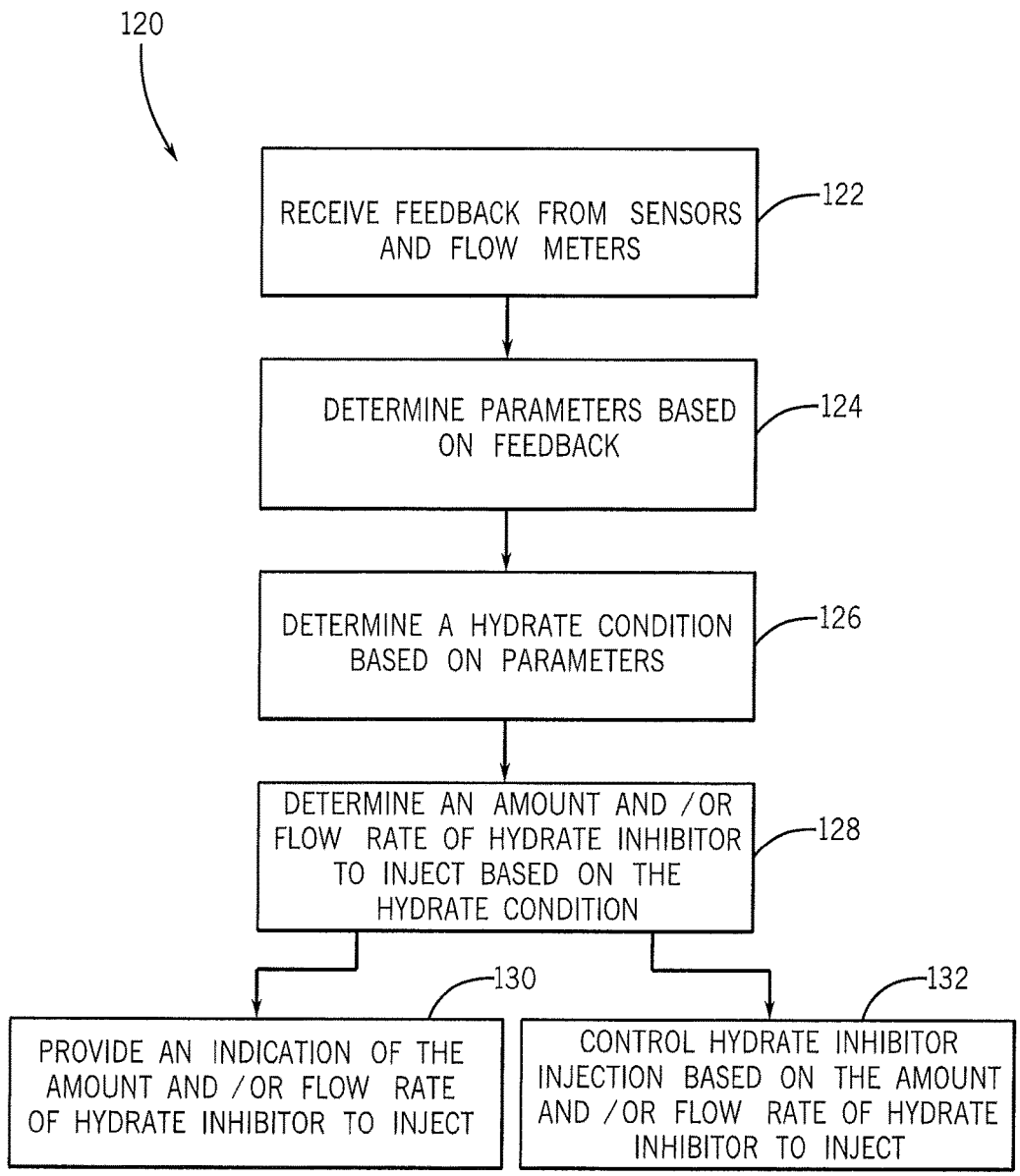
FIG. 7 is a flow diagram of a method for controlling hydrate formation of a hydrocarbon extraction system.

FIG. 7 is an embodiment of a method 120 for controlling hydrate formation of the hydrocarbon extraction system 10. The method 120 may be a computer-implemented method. For example, one or more steps of the method 120 may be executed using the controller 24 (e.g., the processor 60) and/or the computer 74. The method 120 may include receiving (block 122) feedback from one or more sensors 14 and/or one or more flow meters 20 disposed in hydrocarbon extraction system 10. Additionally, the method 120 may include determining (block 124) one or more parameters based on the feedback. For example, the controller 24 may be configured to determine one or more parameters of a fluid flow in the hydrocarbon extraction system 10, such as pressure, temperature, flow rate, fluid density, composition (e.g., water content, injected chemical content, hydrate inhibitor content, a ratio of an injected chemical to water, etc.), or any other suitable parameter. Further, the method 120 may include determining (block 126) a hydrate condition based on the one or more parameters. In particular, the controller 24 may estimate the likelihood of hydrate formation based on the one or more parameters using the one or more modeling programs, hydrate formation curves, algorithms, database, and/or look-up tables described in detail above. Additionally, the method 120 may include determining (block 128) an amount and/or a flow rate (e.g., mass flow) of a hydrate inhibitor to inject based on the hydrate condition. In particular, the controller 24 may determine an amount and/or flow rate of a hydrate inhibitor to inject to reduce or block hydrate formation. The controller 24 may determine the amount and/or flow rate using the modeling programs and/or one or more algorithms, as noted above. Further, as noted above, the controller 24 may be configured to determine a hydrate condition and an amount and/or flow rate of hydrate inhibitor to inject for a plurality of locations about the hydrocarbon extraction system 10.

Additionally, in some embodiments, the method 120 may include providing (block 130) an indication of the amount and/or flow rate of hydrate inhibitor to inject. For example, the controller 24 may cause the user interface 72 to display the indication. In this manner, an operator may view the recommended injection settings and may manually adjust the CIMVs 16 to the recommended injection settings or may provide inputs to the controller 12 to adjust the CIMVs 16 to the recommended settings. In certain embodiments, the method 120 may include adjusting (block 132) the amount and/or flow rate of the hydrate inhibitor to inject. For example, the controller 24 may control the CIMVs 16 to adjust the amount and/or flow rate in a closed-loop control. Further, the method 120 may continue receiving feedback (block 122), determining parameters (block 124), determining the hydrate condition (block 126), and determining an amount and/or flow rate of hydrate inhibitor (block 128).

Figure 8:
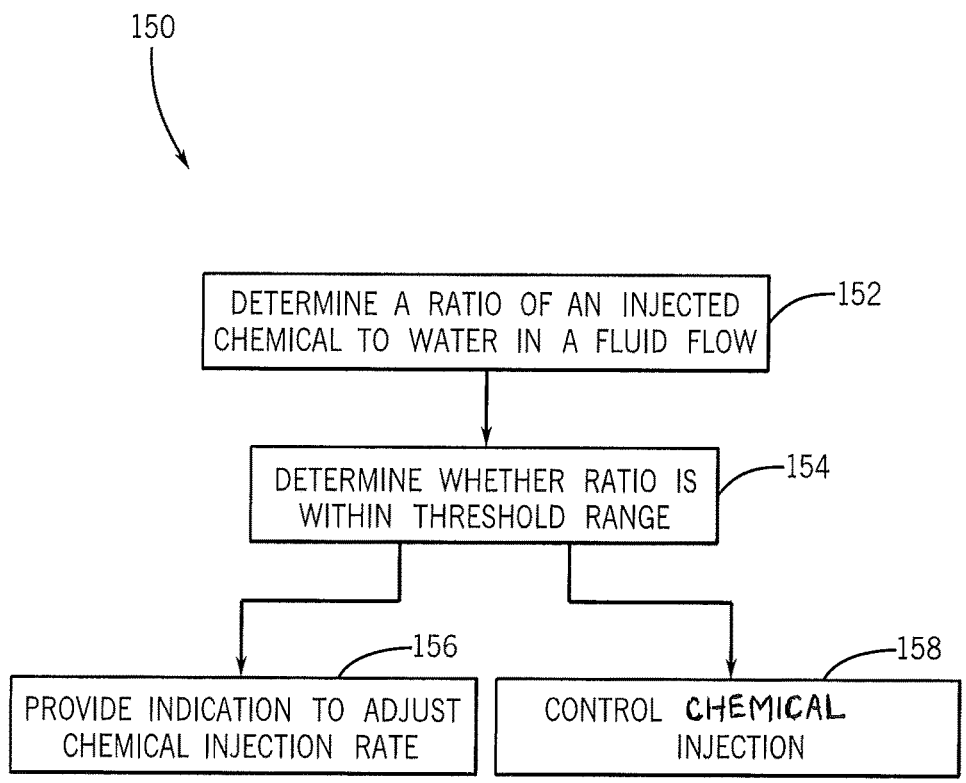
FIG. 8 is a flow diagram of a method for controlling a ratio of an injected chemical to water in a fluid flow.

FIG. 8 is an embodiment of a method 150 for controlling a ratio of an injected chemical relative to water (e.g., ratio=chemical/water) in a fluid flow of the hydrocarbon extraction system 10. The method 150 may be a computer-implemented method. For example, one or more steps of the method 150 may be executed using the controller 24 (e.g., the processor 60) and/or the computer 74. The method 150 may include determining (block 152) a ratio of an injected chemical relative to water in a fluid flow. In particular, the controller 24 may determine the ratio based at least in part on two electromagnetic radiation (EMR) signals. For example, the controller 24 may receive two EMR signals at two different frequencies from a conductivity probe 68 downstream of an injection point (e.g., downstream of a CIMV 16) and may determine the ratio of the injected chemical relative to water based on a comparison of the electromagnetic properties in the fluid in the first EMR signal at the first frequency and the electromagnetic properties in the fluid in the second EMR signal at the second frequency. In some embodiments, the controller 24 may receive a first EMR signal from a conductivity probe 68 upstream of an injection point and a second EMR signal from a conductivity probe 68 downstream of the injection point, and the controller 24 may determine the ratio by comparing electromagnetic properties of the fluid in the first and second EMR signals. Further, in some embodiments, the controller 24 may receive a first EMR signal (e.g., a mid-infrared signal) from an optical sensor 70 upstream of an injection point and a second EMR signal (e.g., mid-infrared signal) from an optical sensor 70 downstream of the injection point, and the controller 24 may determine the ratio based at least in part on the absorbance of the two EMR signals, the absorption coefficient of the injected chemical, the absorption coefficient of water. In certain embodiments, the controller 24 may receive EMR signals (e.g., mid-infrared signals) at multiple wavelengths (e.g., at least two wavelengths) from an optical sensor 70 downstream of an injection point, and the controller 24 may determine the ratio based at least in part on the absorbance of the EMR signals at the multiple wavelengths, the absorption coefficient of the injected chemical, the absorption coefficient of water. Additionally, in some embodiments, the controller 24 may be configured to measure a property of the chemical prior to injection and may be configured to use the measured property in the determination of the ratio. In one embodiment, the controller 24 may measure the water content of the injected chemical prior to injection. For example, as noted above, the lean hydrate inhibitor (e.g., MEG) may still include some water after the regeneration process, so it may be desirable to determine the water content in the hydrate inhibitor prior to injection.

Additionally, the method 150 may include determining (block 154) whether the ratio is within a desired threshold or threshold range. For example, the threshold range may be between approximately 1:1000 and 1000:1, 1:500 and 500:1, 1:250 and 250:1, 1:100 and 100:1, 1:75 and 75:1, 1:50 and 50:1, 1:25 and 25:1, 1:10 and 10:1, 1:5 and 5:1, or any other suitable range. In one embodiment, the threshold (e.g., upper threshold or lower threshold) may be 1:1. In some embodiments, the threshold or threshold range may be based on the type of injected chemical. By way of example, MEG may have a threshold range that is between approximately 1:10 and 10:1, and kinetic hydrate inhibitors may have a threshold range between approximately 1:1 and 1:1000. Accordingly, the controller 24 may be configured to select a threshold range from the memory 62 based on the type of injected chemical.

Further, in some embodiments, the method 150 may include providing (block 156) an indication to adjust the injected chemical rate in response to a determination that the ratio is not within a desired threshold or threshold range. For example, the controller 24 may cause the user interface 72 to display the indication. In some embodiments, the controller 24 may determine an amount and/or flow rate of chemical to inject to achieve the desired ratio, and the controller 24 may cause the user interface 72 to display the recommended injection setting (e.g., amount and/or flow rate). Additionally, in some embodiments, the method 150 may include adjusting (block 158) the amount and/or flow rate of the injected chemical to achieve the desired ratio. For example, the controller 24 may control one or more CIMVs 16 to adjust an amount and/or flow rate of the injected chemical.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A system, comprising:
a chemical injection device configured to inject an injected chemical at a rate of injection;
a controller, communicatively coupled to the chemical injection device; wherein the controller is configured to:
receive feedback from at least one sensor configured to monitor a fluid flow of a hydrocarbon extraction system, wherein the fluid flow comprises water and an injected chemical;
determine a hydrate condition based at least in part on the feedback from the at least one sensor;
determine a ratio of the injected chemical relative to water in the fluid flow; and
instruct the chemical injection device to adjust the rate of injection of the injected chemical into the fluid flow based at least in part on the hydrate condition and the ratio of the injected chemical relative to the water in the fluid flow.

2. The system of claim 1, wherein the controller is configured to:
compare the ratio to a predetermined threshold range; and
determine whether the ratio is within the predetermined threshold range based on the comparison.

3. The system of claim 2, wherein the controller is configured to adjust the rate of injection of the injected chemical in response to determining that the ratio is outside of the predetermined threshold range.

4. The system of claim 1, wherein the injected chemical comprises a hydrate inhibitor.

5. The system of claim 1, comprising a user interface coupled to the controller, wherein the controller is configured to cause the user interface to display the ratio of the injected chemical relative to water of the fluid flow.

6. The system of claim 1, comprising the at least one sensor, wherein the at least one sensor comprises a first sensor disposed downstream of a chemical injection point.

7. The system of claim 6, wherein the first sensor comprises a conductivity probe.

8. The system of claim 6, wherein the at least one sensor comprises a second sensor disposed upstream of the chemical injection point.

9. The system of claim 8, wherein the first sensor and the second sensor are conductivity probes.

10. The system of claim 1, comprising a modeling system stored in a memory device, wherein the controller is configured to use the modeling system to predict a likelihood of hydrate formation along the fluid flow.

11. The system of claim 10, wherein the modeling system is configured to predict the likelihood of hydrate formation based on at least one of a plurality of fluid flow parameters, wherein the plurality of fluid flow parameters include temperature, pressure, flow rate, fluid density, salinity, composition, water content, and the ratio of the injected chemical.

12. The system of claim 11, wherein the modeling system is configured to predict the likelihood of hydrate formation based at least in part on historical data of hydrate formations or the at least one of the plurality of fluid flow parameters.

13. A system, comprising:
a hydrocarbon extraction system comprising:
a chemical injection device configured to inject a chemical at an injection rate into a fluid flow;
a first sensor disposed downstream of the chemical injection device and configured to generate feedback relating to a mixed fluid flow comprising the chemical and water;
a user interface configured to provide an indication to adjust the injection rate and receive input to adjust the injection rate; and
a controller configured to:
determine a ratio of the injected chemical relative to the water in the mixed fluid flow based at least in part on the feedback from the first sensor;
instruct the user interface to provide the indication to adjust the injection rate based at least in part on the ratio of the chemical relative to the water in the mixed fluid flow; and
instruct the chemical injection device to adjust the injection rate of the chemical into the mixed fluid flow based on the input to adjust the injection rate from the user interface.

14. The system of claim 13, wherein the controller is configured to compare the ratio to a threshold and instruct the chemical injection device to adjust the injection rate of the chemical based at least in part on comparing the ratio to the threshold.

15. The system of claim 13, wherein the first sensor comprises a conductivity probe configured to generate a first electromagnetic radiation signal at a first frequency and a second electromagnetic radiation signal at a second frequency, and wherein the controller is configured to determine the ratio based on a comparison of the first electromagnetic radiation signal and the second electromagnetic radiation signal.

16. The system of claim 13, comprising a second sensor disposed upstream of the chemical injection device, wherein the second sensor is configured to generate feedback relating to the fluid flow.

17. The system of claim 16, wherein the first sensor and the second sensor comprise a first conductivity probe and a second conductivity probe, respectively, and wherein the controller is configured to determine the ratio based on a comparison of feedback from the first conductivity probe and feedback from the second conductivity probe.

18. The system of claim 13, wherein the first sensor comprises an optical sensor, and wherein the controller is configured to determine the ratio based feedback from the optical sensor.

19. The system of claim 18, wherein the optical sensor is configured to emit a first wavelength of light corresponding to a water absorption peak and a second wavelength of length corresponding to a chemical absorption peak.

20. The system of claim 18, wherein the optical sensor is configured to emit at least two wavelengths of light, wherein the two wavelengths of light are between 2500 nanometers and 50000 nanometers.

21. The system of claim 13, wherein the controller is configured to measure a property of the injected chemical prior to injection of the injected chemical into the fluid flow, and wherein the controller is configured to use the measured property to determine the ratio of the injected chemical relative to the water in the mixed fluid flow.

22. A method comprising:
determining, via a controller, a ratio of an injected chemical injected by a chemical injection device relative to water in a fluid flow of a hydrocarbon extraction system based on feedback from at least one sensor;
comparing, via the controller, the ratio to a threshold or a threshold range; and
controlling, via the controller, injection of the injected chemical from the chemical injection device based at least in part on the comparing, via the controller, the ratio to the threshold or the threshold range.

23. The method of claim 22, comprising the step of determining, via the controller, a hydrate condition based on the feedback from the at least one sensor.

24. The method of claim 22, comprising receiving, via the controller, the feedback from the at least one sensor, wherein the at least one sensor comprises a conductivity probe or an optical sensor disposed downstream of a chemical injection point.

\* \* \* \* \*